United States Patent
Frank et al.

(10) Patent No.: US 8,108,873 B1
(45) Date of Patent: Jan. 31, 2012

(54) SYSTEM FOR EXTENDING AN ADDRESSABLE RANGE OF MEMORY

(75) Inventors: Richard L. Frank, Groton, MA (US); Gopalan Arun, Nashua, NH (US); Michael J. Cusson, Chelmsford, MA (US); Daniel E. O'Shaughnessy, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1187 days.

(21) Appl. No.: 11/724,522

(22) Filed: Mar. 14, 2007

(51) Int. Cl.
*G06F 9/46* (2006.01)
*G06F 9/26* (2006.01)
*G06F 3/00* (2006.01)

(52) U.S. Cl. .................. 718/104; 711/203; 719/321
(58) Field of Classification Search .................. 718/104
See application file for complete search history.

(56) References Cited

U.S. PATENT DOCUMENTS

| 5,016,166 | A  | * | 5/1991 | Van Loo et al. | 718/104 |
| 5,940,868 | A  | * | 8/1999 | Wagner | 711/203 |
| 6,032,240 | A  | * | 2/2000 | Brown | 711/173 |
| 7,194,740 | B1 | * | 3/2007 | Frank et al. | 718/102 |

* cited by examiner

*Primary Examiner* — Kenneth Tang

(57) ABSTRACT

A method and system provides a requested memory to a requesting process. The memory is requested by a consumer process residing in application space. The consumer process requests the requested memory from a Very Large Memory (VLM) driver in the operating system. The size of the requested memory may be larger than the maximum size per process supported by the operating system. The VLM driver creates one or more donor processes residing in application space dependent on the size of the requested memory. Each donor process requests an allocation of a portion of memory less than the maximum size per process supported by the operating system. Having received the requested memory, the donor process transfers ownership of the portion of memory to the VLM driver. The VLM driver provides the requested memory provided by the donor processes to the consumer process.

15 Claims, 9 Drawing Sheets

SYSTEM FOR EXTENDING AN ADDRESSABLE RANGE OF MEMORY

RELATED APPLICATIONS

This application is related to co-pending application Ser. No. 09/321,990 entitled "System for Efficiently Maintaining Virtual Memory Consistency" by Richard Frank, Gopalan Arun, Michael Cusson and Daniel E. O'Shaughnessy, the entire teachings of which are incorporated herein by reference.

BACKGROUND OF THE INVENTION

The maximum size of a computer system's addressable memory is dependent on the size of the computer system's memory address bus. For example, if a computer system's memory address bus is 32 bits, wide, the maximum size of the computer system's memory is $2^{32}$ (4 Gigabytes) of memory. If a computer system's memory bus is 64 bits wide the maximum size of the computer system's memory is $2^{64}$ bytes.

All of the computer system's addressable memory may not be physically present in the computer system. Memory physically in the computer system is called physical memory. The physical memory may be volatile memory such as Random Access Memory ("RAM") or non-volatile memory such as Erasable Programmable Read Only Memory ("EPROM").

A typical computer system includes memory management hardware for managing the addressable memory. The computer system's operating system, a sequence of program instructions resident in the computer system's memory, includes program instructions for controlling the memory management hardware. The operating system in conjunction with the memory management hardware manages the physical memory for applications executing in the computer system.

An application includes processes to be executed by a processor in the computer system. A process is a sequence of program instructions in the application. Other program instructions in the application start and terminate the process. Once the process starts executing it may request allocation of addressable memory from the operating system in order to perform the operations encoded in the program instructions.

Management of the computer system's addressable memory by the operating system includes allocating addressable memory to processes executing in the computer system. The allocation of addressable memory includes mapping addressable memory addresses to addresses of physical memory present in the computer system. The maximum addressable memory to be allocated by the operating system to a process is determined by the operating system. For example, a 32 bit operating system with a maximum addressable memory of 4 Gigabytes, such as Microsoft Windows NT operating system, executing in a computer system with a maximum addressable size of $2^{64}$ bytes, such as computer systems utilizing Compaq Computer Corporations's Alpha Processor limits the per process maximum addressable memory to 2 Gigabytes.

A limit on the maximum memory allocated to a process imposed by an operating system impacts the performance of the application.

SUMMARY

A virtual memory allocation technique provides memory for a process greater than the per process maximum memory size supported by an operating system. A plurality of processes are created with each process being allocated a respective amount of memory. The memory from each of the created processes is pooled for use by at least one of the created processes. The created processes include a single consumer process and at least one donor process. The number of donor processes can be determined from the amount of allocated memory.

In particular, a memory driver receiving a request for memory from a process greater than the maximum per process limit for the operating system can create one or more donor processes. The number of created donor processes is dependent on the size of the requested memory and the maximum per process memory size per process supported by the operating system. The memory driver may also allocate the maximum per process memory size directly for the process.

The created donor process then requests allocation of memory. The allocation request may be equal to the maximum per process memory size or may be less than the maximum per process memory size. The donor process transfers ownership of the allocated memory to the memory driver.

The memory driver avails the allocated memory provided by the donor processes to the process. The donor process holds the allocated memory for the process until it receives a terminate request from the memory driver.

BRIEF DESCRIPTION OF THE DRAWINGS

The foregoing and other objects, features and advantages of the invention will be apparent from the following more particular description of preferred embodiments of the system for extending an addressable range of memory, as illustrated in the accompanying drawings in which like reference characters refer to the same parts throughout the different views. For clarity of description, the drawings are not necessarily to scale, emphasis instead being placed upon illustrating the principles of the invention.

DETAILED DESCRIPTION

Figure 1:
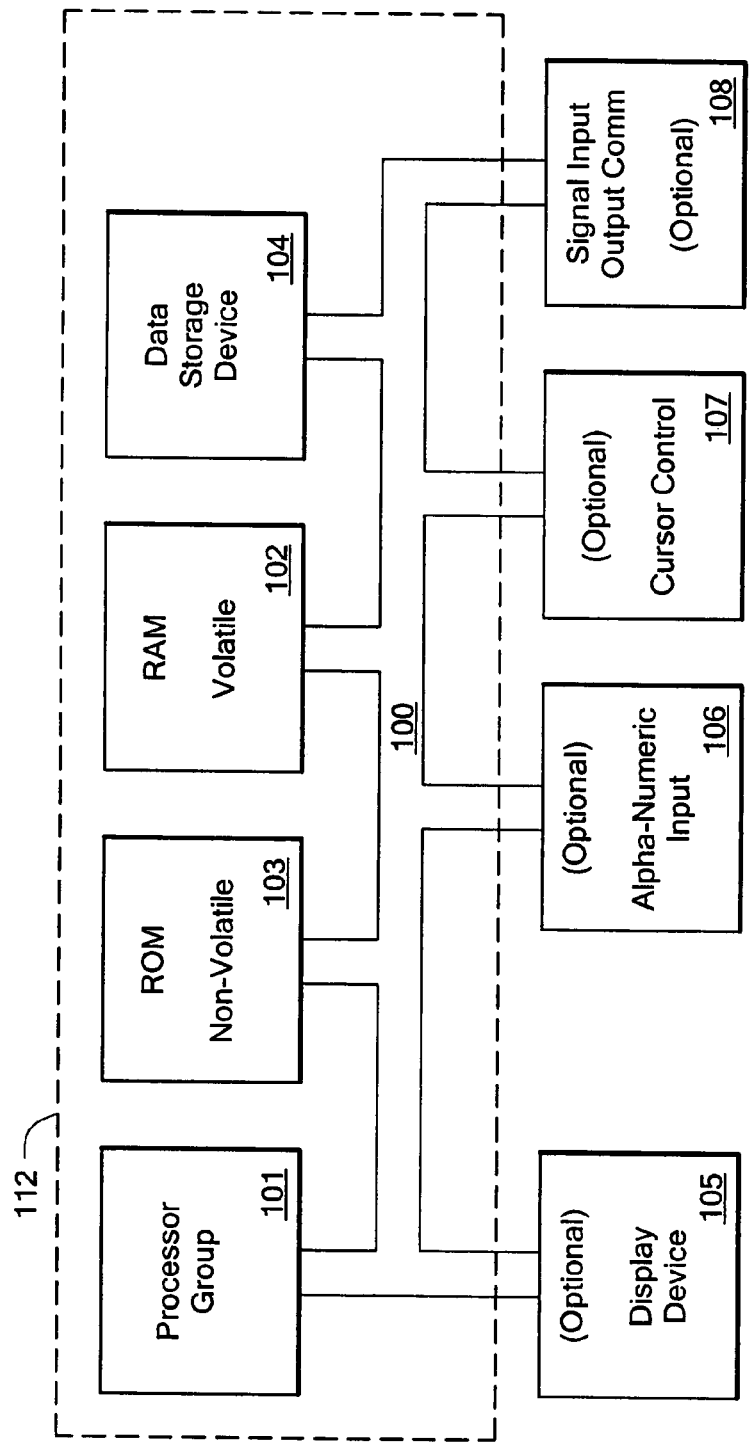
FIG. 1 is a block diagram of a computer system in which the system for extending an addressable range of memory may be used.

FIG. 1 is a block diagram of a computer system 112 in which the system for extending an addressable range of memory can be utilized. In general, computer system 112 includes one or more processors 101, non-volatile memory 103 and volatile memory 102 connected by a processor bus 100. The processor bus 100 includes a data bus (not shown) and an address bus (not shown) for communicating program instructions. The processor 101 processes program instructions. The volatile memory 102 includes memory such as Random Access Memory ("RAM") for storing program instructions. The non-volatile memory includes memory such as Read Only Memory ("ROM") for storing program instructions. The computer system 112 also includes a mass storage computer readable data storage device 104 such as a magnetic or optical disk drive, connected to the processor bus 10, for storing program instructions.

Optionally, the computer system 112 may include a display device 105, an alphanumeric input device 106, a cursor control device 107 or a signal generating device 108 connected to the processor bus. The display device 105 displays information to the computer user. The alphanumeric input device 106 includes alphanumeric and function keys for communicating information and command selection to the processors 101. The cursor control device 107 communicates user input information and command selections to the processor 101. The signal generating device 108 communicates command selections to the processor 101.

Figure 2:
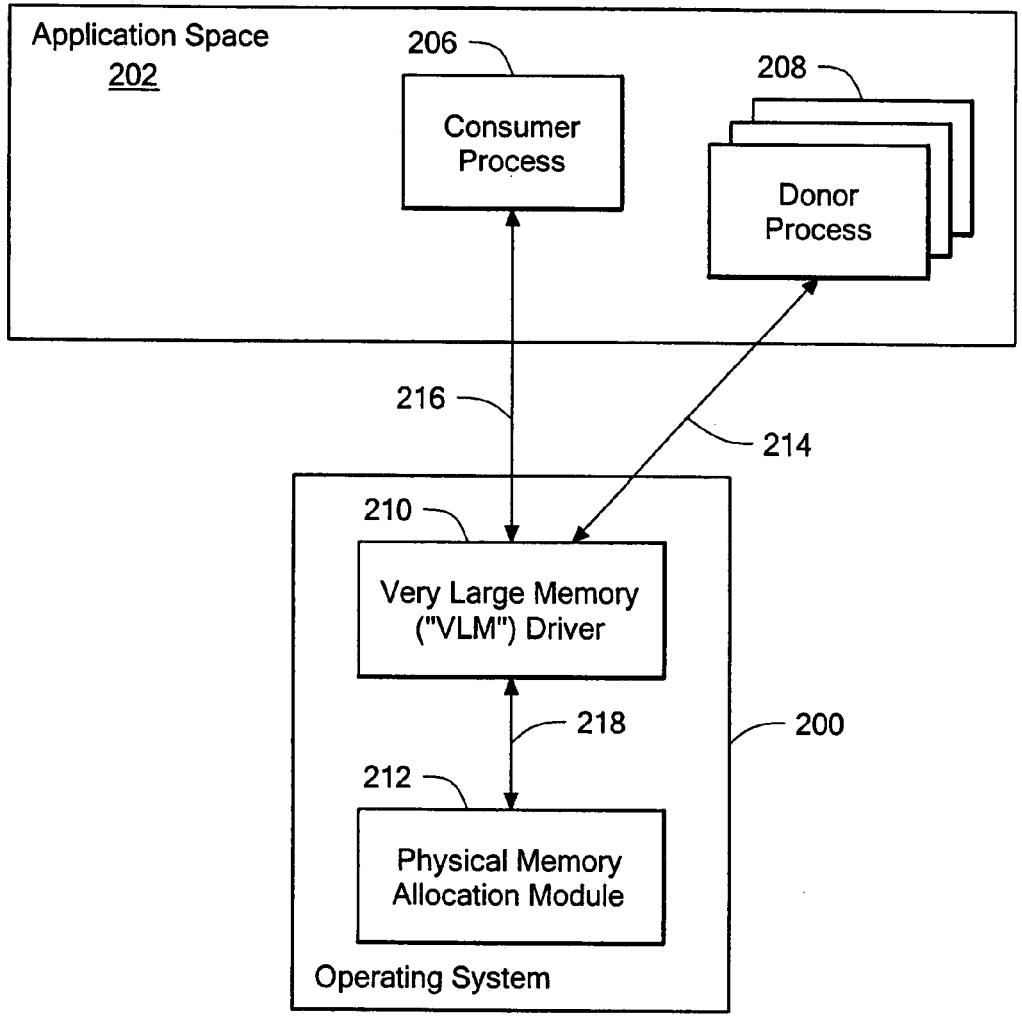
FIG. 2 is a block diagram showing application space and operating system located in the RAM shown in FIG. 1.

FIG. 2 is a block diagram of a typical organization of addressable memory in the computer system 112 shown in FIG. 1. The addressable memory includes an operating system 200 and an application space 202. The operating system 200 includes device drivers for managing the computer system's resources such as, the data storage device 105 (FIG. 1), display device 105 (FIG. 1) and memory 103 (FIG. 1), 102 (FIG. 1). The device drivers are a set of software modules for managing the resource. The software modules include program instructions to be executed by the processor 110 (FIG. 1).

The application space includes processes such as a consumer process 206 and one or more donor process(es) 208. A process includes one or more software routines resident in memory in the computer system 112 (FIG. 1). A software routine is a set of program instructions. The consumer process 206 issues a request to the operating system 200 for access to the computer system's resources. The request from the consumer process 206 may be to store a file in the data storage device 104 (FIG. 1) or for a portion of RAM 102 (FIG. 1) to be allocated to the consumer process 206.

Requests from the consumer process 206 for addressable memory in the computer system 112 (FIG. 1) are sent through a consumer process interface 216 to a Very Large Memory ("VLM") driver 210 in the operating system 200. The VLM driver 210 includes one or more software modules and routines for managing the addressable memory in the computer system 112 (FIG. 1). After the VLM driver 210 has allocated the requested memory for the consumer process 206, the allocated memory may be mapped to physical memory through the physical memory allocation module 212 in the operating system 200. Methods for mapping allocated memory to physical memory are described in U.S. Pat. No. 5,860,144 entitled "Addressing Method and System for Providing Access of a Very Large Size Physical Memory Buffer to a Number of Processes" by Frank et al. Ser. No. 09/321,990 entitled "System for Maintaining Virtual Memory Consistency" by Richard Frank, Gopalan Arun, Michael Cusson and Dan O'Shaughnessy, the entire teachings of which are incorporated herein by reference.

Figure 6:
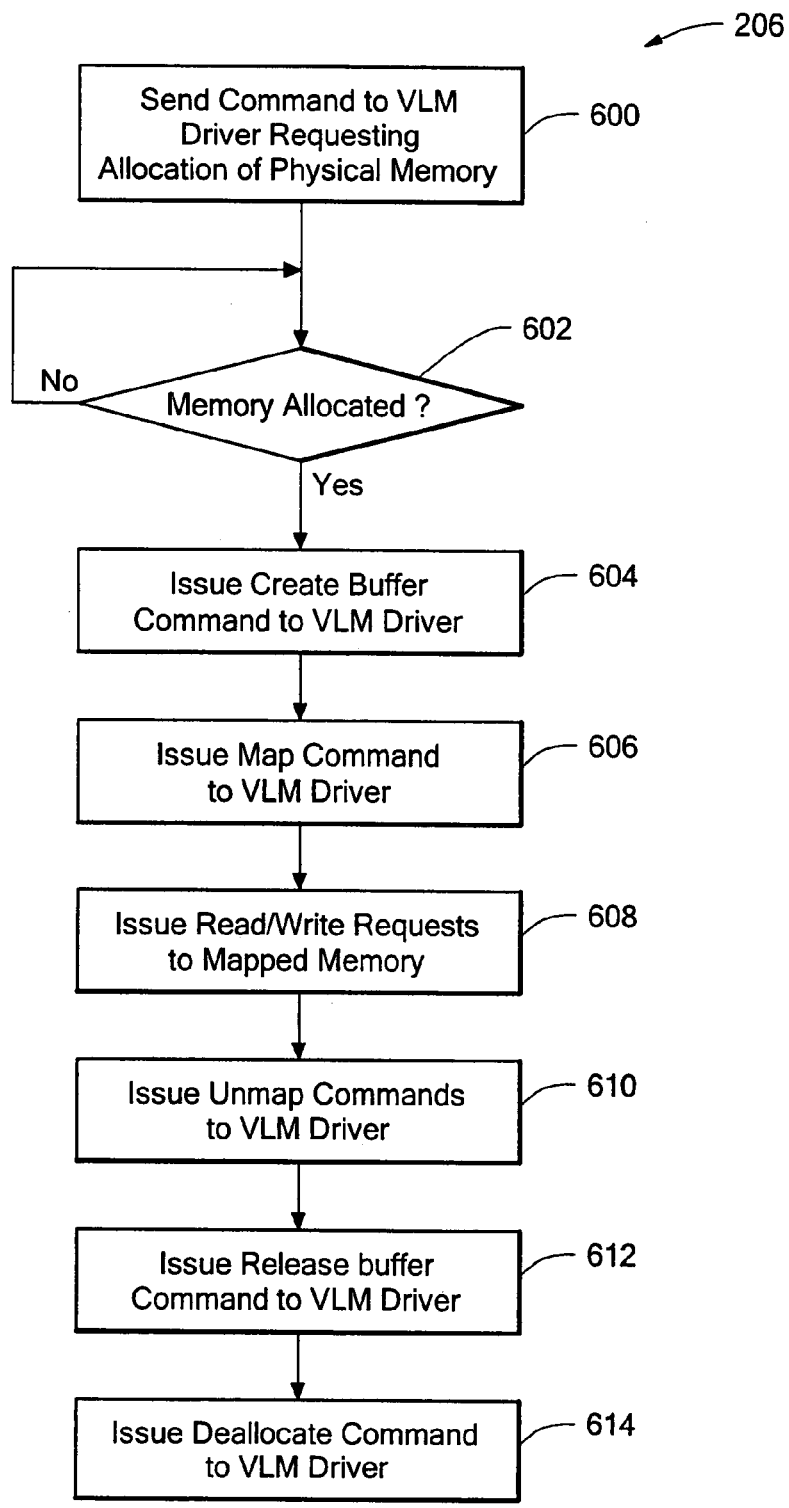
FIG. 6 is a flowchart showing the steps in the consumer process for allocating, deallocating and accessing memory.
Figure 7:
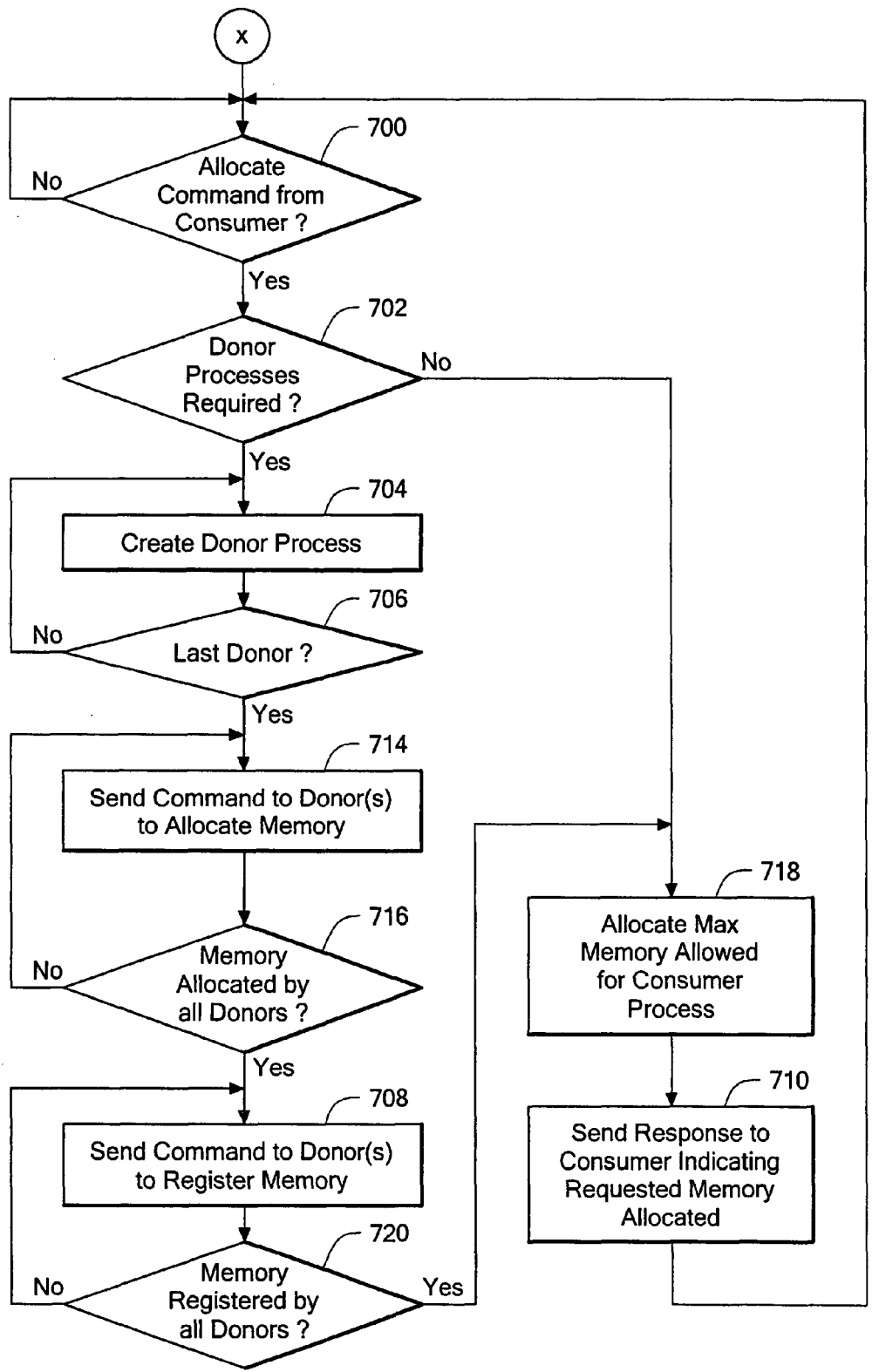
FIG. 7 is a flowchart showing the steps in the VLM driver for allocating memory for the consumer process.
Figure 8:
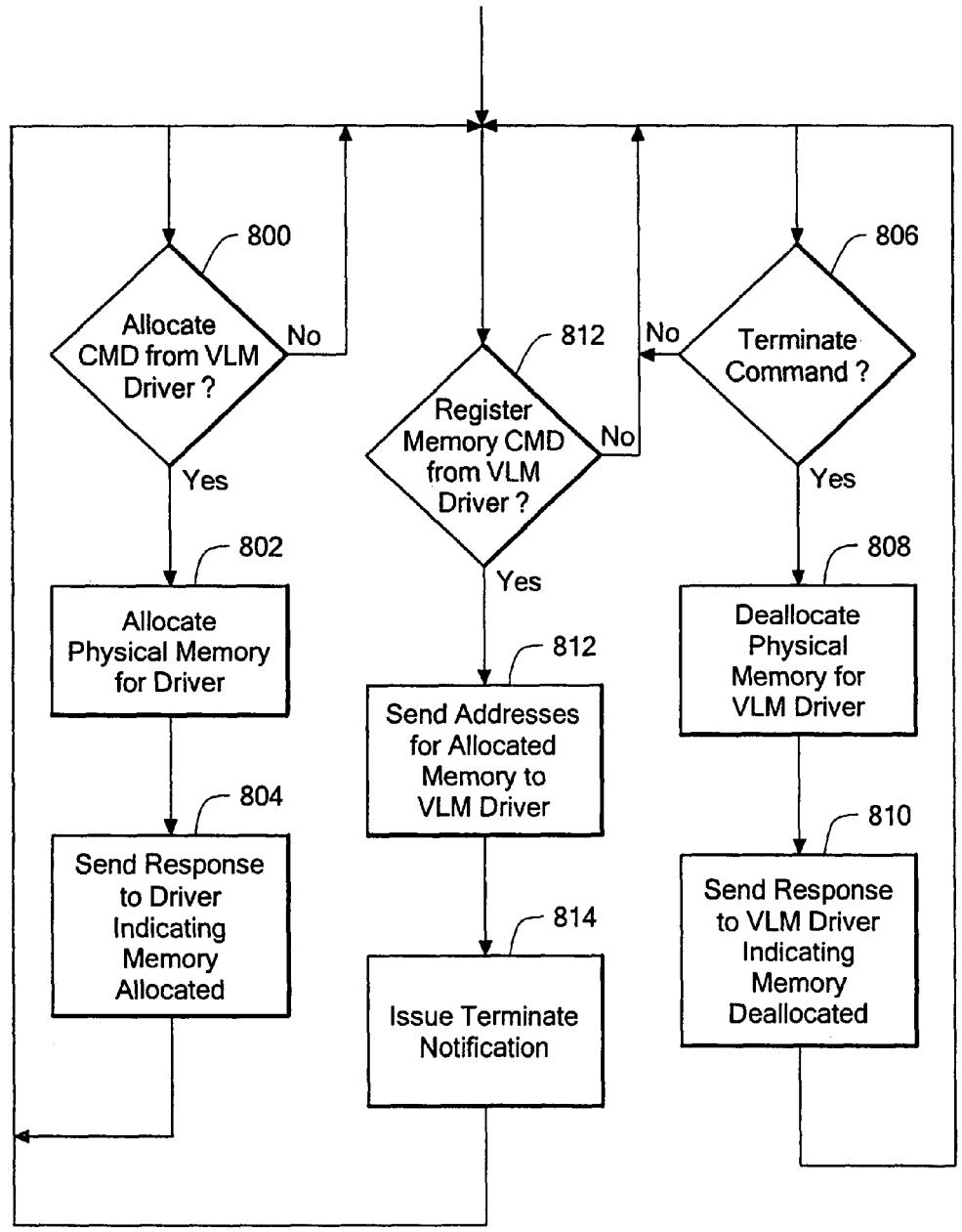
FIG. 8 is a flowchart showing the steps in the donor process for allocating and deallocating memory.

The steps for allocating memory by the consumer process 206 (FIG. 2) are described in conjunction with FIGS. 6-8. FIG. 6 describes the steps implemented in the consumer process 206. FIG. 7 describes the steps implemented in the VLM driver 210. FIG. 8 describes the steps implemented in the donor process 208.

Figure 3:
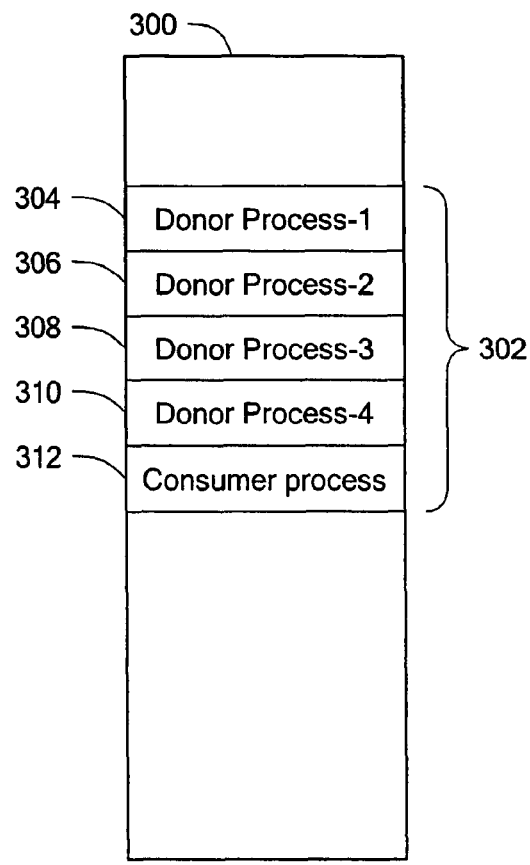
FIG. 3 is a block diagram showing memory allocated for the consumer process shown in FIG. 2.

FIG. 3 is a block diagram showing a requested allocation of memory 302 from the addressable memory 300 to the consumer process 206 (FIG. 2) by the VLM driver 210 (FIG. 1). The requested allocation 302 is greater than the per process maximum allocation supported by the operating system 200 (FIG. 2). The requested allocation 302 includes the direct consumer process allocation 312, an allocation to donor process_1 304, an allocation to donor process_2 306, an allocation to donor process_3 308 and an allocation to donor process_4 310. For example, if the per process maximum is 2 Gigabytes and the requested allocation from the consumer process 206 (FIG. 2) is 10 Gigabytes. The 10 Gigabytes is allocated to the consumer process 206 (FIG. 2) by the VLM driver 210 (FIG. 2) by allocating 2 Gigabytes directly to the consumer process allocation 312 and allocating 2 Gigabytes to each of donor process_1 304, donor process_2 306, donor process_3 308 and donor process_4 310.

Figure 4:
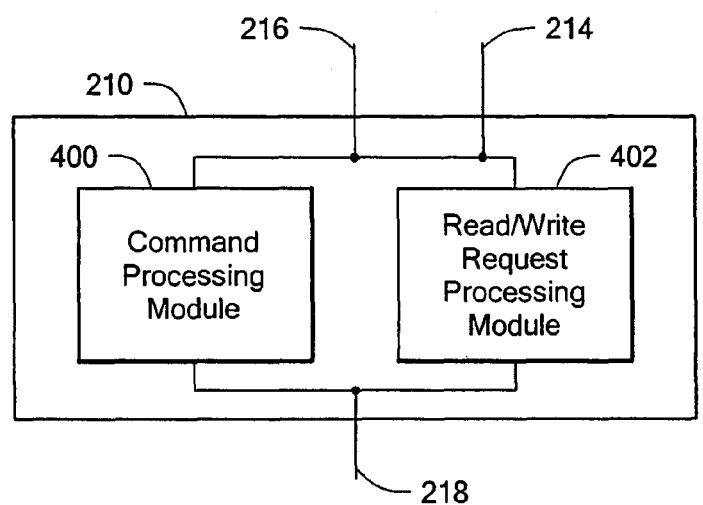
FIG. 4 is a block diagram showing the VLM driver shown in FIG. 3.

FIG. 4 is a block diagram showing the VLM driver 210. As shown, the VLM driver 210 further includes a command processing software module 400 and a read/write request processing module 402. The command processing module 400 includes one or more software routines for processing commands sent to the VLM driver 210 by a process such as, a consumer process 206 (FIG. 2) or a donor process 208 (FIG. 2). A receiving routine (not shown) in the command processing module 400 receives all commands from the consumer process interface 216 and the donor process interface 214.

The command processing module 400 performs operations for the donor process 208 (FIG. 2) and the consumer process 206 (FIG. 2) dependent on a command received in the receiving routine through the donor process interface 214 (FIG. 2) or the consumer process interface 216.

The read/write request processing module 402 transfers requests from the consumer process 206 (FIG. 2) to the requested allocated memory 302 (FIG. 3) for the consumer process 206 (FIG. 2).

Figure 5:
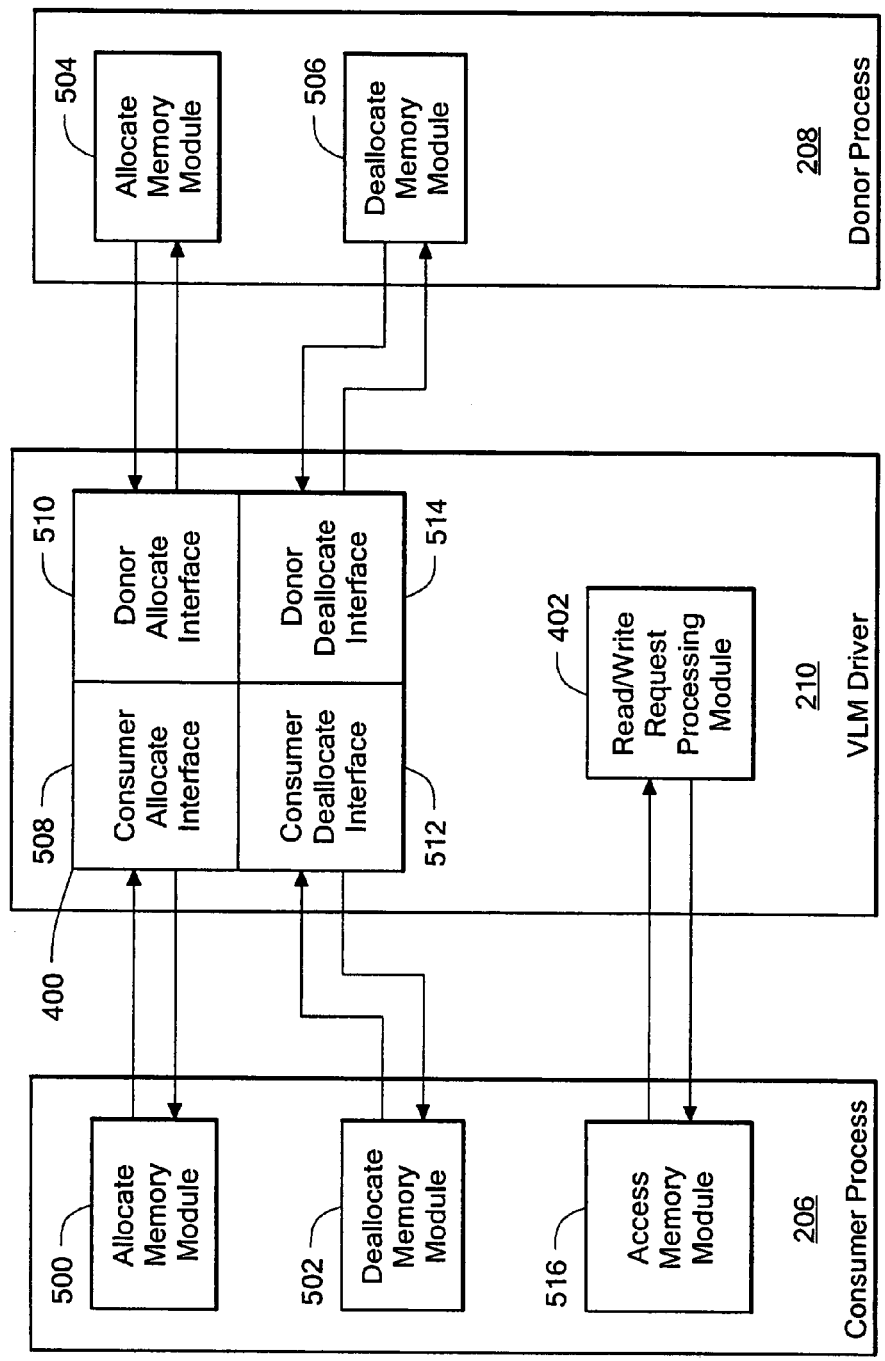
FIG. 5 is a block diagram showing the software interfaces between a consumer process, the VLM driver and a donor process.

FIG. 5 is a block diagram showing the software interfaces between the VLM driver 210, the donor process 208 and the consumer process 206. The consumer process 206 includes an allocate memory module 500, an access memory 516 and a deallocate memory module 502. The donor process 208 includes an allocate memory module 504 and a deallocate memory module 506. The VLM driver 210 includes a command processing module 400 and a read/write request processing module 402.

The command processing module 400 includes a consumer allocate interface 508, a donor allocate interface 510, a consumer deallocate interface 512 and a donor deallocate interface 514. The consumer allocate interface 508 includes software routines for receiving and processing commands from the allocate memory module 500 in the consumer process 206. The donor allocate interface 510 includes software routines for receiving and processing commands from the allocate memory module 504 in the donor process 508. The consumer deallocate interface 512 includes software routines for receiving and processing commands from the deallocate memory module 502 in the consumer process 206. The donor deallocate interface 514 includes software routines for receiving and processing commands from the deallocate memory module 506 in the donor process 208.

The read/write request processing module 402 includes software routines for receiving and processing commands from the access memory module 516 in the consumer process.

The steps for allocating memory by the consumer process 206 (FIG. 2) are described in conjunction with FIGS. 6-8. The discussion begins with FIG. 6, which describes the steps implemented in the allocate memory module 500 in the consumer process 206. FIG. 7 describes the steps implemented in the consumer allocate interface 508 and the donor allocate interface 510 in the VLM driver 210. FIG. 8 describes the steps implemented in the allocate memory module 504 in the donor process 208.

FIG. 6 is a flowchart showing the steps in the consumer process 206 for allocating, deallocating and accessing memory. At step 600, in FIG. 6 the consumer process 206, executing in application space 202 (FIG. 2) requests allocation of addressable memory from the operating system 200 (FIG. 2). The request is sent to the VLM driver 210 through the receive command routine in the command processing module 400 (FIG. 4).

FIG. 7 is a flowchart showing the steps in the VLM driver 210 for allocating memory for the consumer process. At step 700, the command processing module 400 (FIG. 4) in the VLM driver 210 (FIG. 4) determines that the command is a request from the consumer process 206 for physical memory allocation. At step 702, the donor process creation routine (not shown) in the VLM driver 210 determines if the requested memory allocation is greater than the per process maximum supported by the operating system 200 (FIG. 2). If not, at step 718, the requested memory is allocated for the consumer process from the operating system 200 and at step 710, a response is issued to the consumer process 206 indicating that the requested memory has been allocated. If so, the donor creation routine in the VLM driver 210 determines the number of donor processes required. For example, if the consumer process 206 memory request is 8 Gigabytes and the per process maximum is 2 Gigabytes, three donor processes 208 are required.

At step 704, the donor process creation routine in the VLM driver 210 creates a donor process 208. A donor process 208 includes one or more software routines resident in memory. A donor process 208 is created by executing a program instruction to start executing a software routine in the donor process 208. At step 706, the donor process creation routine in the VLM driver 210 determines if another donor process 208 is to be created. If so, at step 704, the donor process creation routine in the VLM driver 210 creates another donor process 208. If not, the VLM driver 210 may issue commands to the created donor process 208.

After a donor process 208 has been created by the VLM driver 210, the donor process 208 starts executing the program instructions in the software routines to issue commands to the command processing module 400 (FIG. 4) in the VLM driver 210. At step 714, the VLM driver 210 issues a command to the donor process 208 requesting memory allocation less than or equal to the maximum per process memory allocation request supported by the operating system 200.

FIG. 8 is a flowchart showing the steps in the donor process 208 for handling commands issued by the VLM driver 210. At step 800, the donor process 208 receives a command from the VLM driver 210 requesting an allocation of memory. At step 802, the donor process 208 allocates the physical memory by issuing memory allocation calls to the operating system 200. At step 804, the donor sends a response to the VLM driver 210 indicating that the requested memory has been allocated.

Returning to FIG. 7 at step 716 the VLM driver 210 detects that memory has been allocated by the donor process 208. At step 708, the VLM driver 210 sends a command to the donor process 208 to register the allocated memory.

Continuing with FIG. 8, at step 812 the donor process 208 receives the register command from the VLM driver 210. The ownership transfer routine (not shown) in the donor process 208 donates the memory allocated from the operating system 200 to the consumer process 206 by transferring ownership of the memory to the VLM driver 210. At step 814, the donor process returns the addresses for the physical memory allocated to the VLM driver 210.

The VLM driver 210 creates a mapping table (not shown) to link the physical memory allocated to the Page Table Entries (PTEs).

At step 814, the donor process 208 sends a command to the VLM driver 210 requesting that the VLM driver 210 notify it whenever there is a request to release the allocated memory including a release request from the consumer process 206. After sending this command to the VLM driver 210, the donor process 208 waits for a release request from the VLM driver 210. While the donor process 208 waits it sleeps and executes no further program instructions.

The donor processes 208 must continue to sleep in order to hold the allocated memory which has been donated by the VLM driver 210 to the consumer process 206. The donor process 208 sleeps until it receives a request from the VLM driver 210 indicating that the consumer process 206 no longer requires the memory and the memory can be deallocated. The deallocation of the allocated memory is discussed in conjunction with FIGS. 6, 8 and 9.

Continuing with FIG. 7, at step 720, the VLM driver 210 waits until all the created donor processes 208 have registered their allocated memory. Upon detecting all donor process memory is registered, at step 718, the max per process memory is allocated for the consumer process from the operating system 200. At step 710, the availing routine (not shown) in the VLM driver 210 sends a response to the request from the consumer process 206. The response informs the consumer process 206 that the requested memory has been allocated and is available for use by the consumer process 206

The creation of the donor processes is under the control of the VLM driver 210 in the operating system 200 and are hidden from the consumer process 206. The VLM driver 210 after allocating the memory requested by the consumer process 206 provides access to the allocated memory to the consumer process 206 through the consumer process interface 216.

Figure 9:
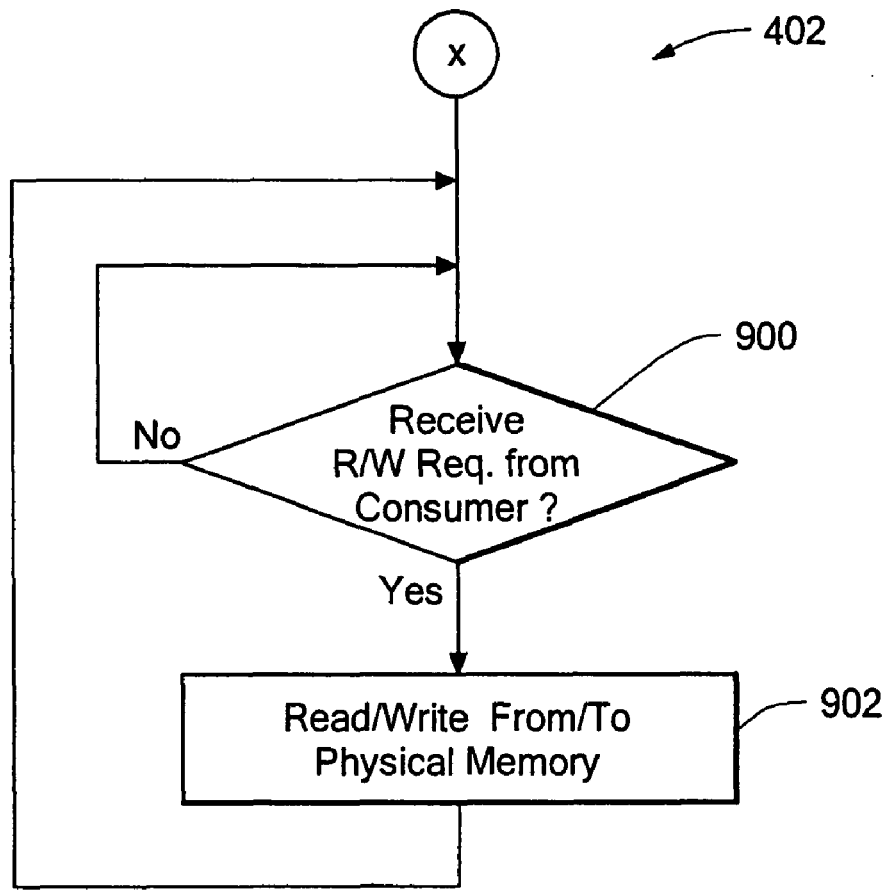
FIG. 9 is a flowchart showing the steps in the VLM driver for handling requests from the consumer process to read/write allocated memory.

The steps for accessing allocated memory by the consumer process 206 (FIG. 2) are described in conjunction with FIGS. 6 and 9. FIG. 6 describes the steps implemented in the access memory module 516 (FIG. 5) in the consumer process 206. FIG. 9 describes the steps implemented in the read/write request processing module 402 (FIG. 5) in the VLM driver 210. The consumer process 206 accesses the memory through the read/write request processing module 402 (FIG. 4) in the VLM driver 210 (FIG. 4).

Returning to FIG. 6, after the physical memory has been allocated to the consumer process 206 the VLM driver 210 is responsible for providing access to the allocated physical memory. The allocated memory, as shown in FIG. 3, includes physical memory supplied by the consumer process 206 and the donor processes. The VLM driver 210 manages the allocated memory for the consumer process 206.

At step 604, the consumer process 206 issues a command to the VLM driver 210 to create a buffer. This command is issued to the command processing module 400 in the VLM driver 210. The VLM driver 210 on receiving this request associates physical memory from the allocated memory to the buffer of virtual memory created for the consumer process 206.

At step 606, the consumer process 206 issues a map request to the VLM driver 210. This command is issued to the command processing module 400 in the VLM driver 210. The VLM driver 210 maps physical memory from the buffer to the virtual address space of the consumer process 206.

At step 608, the consumer process 206 issues read or write requests to the mapped memory through the VLM driver 210.

FIG. 9 is a flowchart showing the steps in the read/write request processing module 402 (FIG. 5) in the VLM driver 210 for handling requests from the consumer process 206 to read/write allocated memory. At step 900, the Read/Write request processing module 402 (FIG. 4) in the VLM driver 210 receives a request from the consumer process 206 to read from or write to the allocated memory.

At step 902, the VLM driver 210 issues the read or write request for the consumer process 206 to the physical memory interface module 212 (FIG. 2) in the operating system 200.

Figure 10:
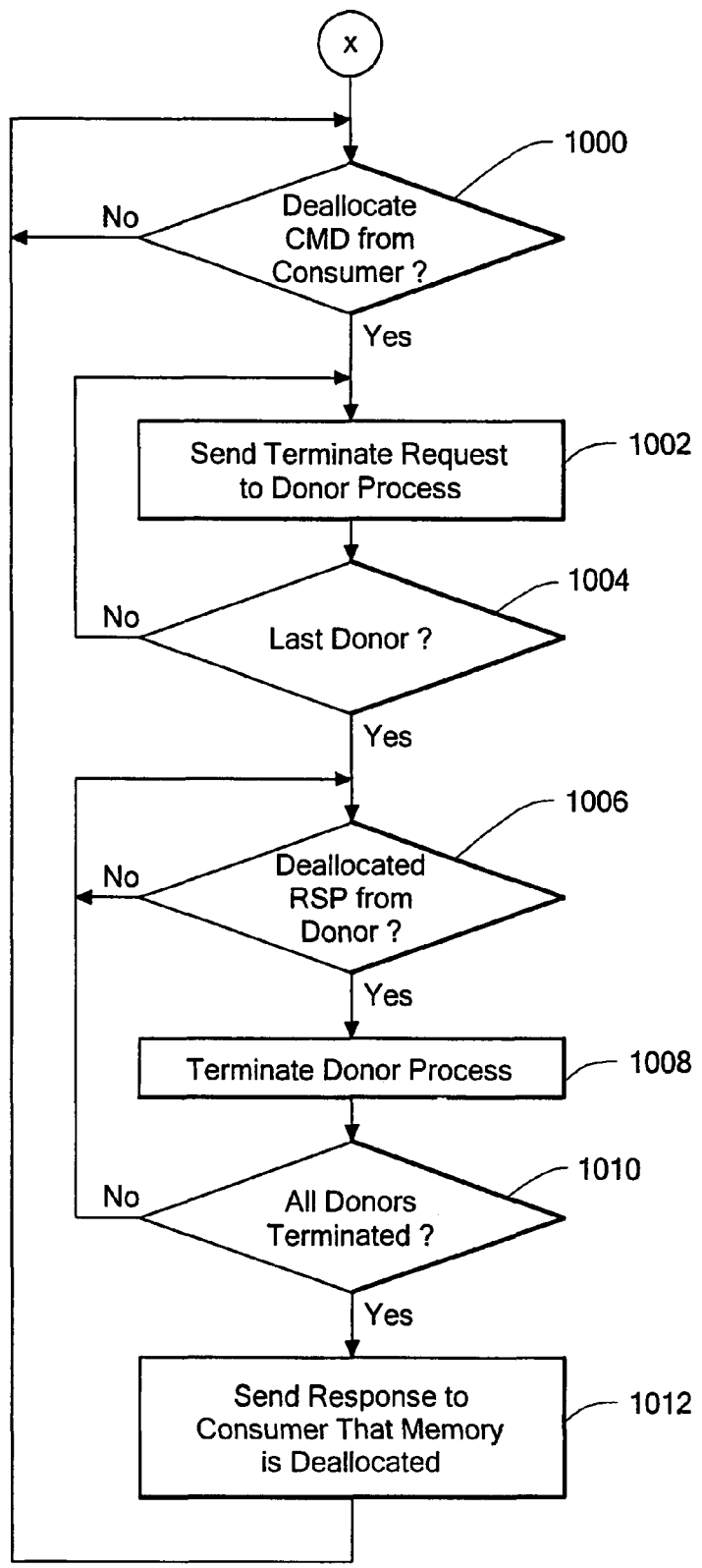
FIG. 10 is a flowchart showing the steps in the VLM driver for deallocating memory from the consumer process and the donor process.

The steps for de-allocating the requested allocated memory for the consumer process 206 (FIG. 2) are described in conjunction with FIGS. 6, 8 and 10. FIG. 6 describes the steps implemented in the deallocate memory module 502 (FIG. 5) in the consumer process 206. FIG. 10 describes the steps implemented in the consumer deallocate interface 512 (FIG. 5) and the donor deallocate interface 514 (FIG. 5) in the command processing module 400 (FIG. 5) in the VLM driver 210. FIG. 8 describes the steps implemented in the deallocate memory module 506 (FIG. 5) in the donor process 208.

Returning again to FIG. 6, before the consumer process 206 terminates executing program instructions in the computer system all allocated memory for the consumer process 206 is returned to the operating system 200.

At step 610, the consumer process 206 issues a request to the command processing module 400 in the VLM driver 210 to unmap the physical memory from the buffer created by the consumer process 206.

At step 612, the consumer process 206 issues a request to the command processing module 400 in the VLM driver 210 to release the buffer created for the consumer process from the memory allocated by the donor processes.

At step 614, the consumer process issues a request to the command processing module 400 in the VLM driver 210 requesting deallocation of the allocated memory.

FIG. 10 is a flowchart showing the steps in the VLM driver for deallocating memory from the consumer process 206 and the donor process 208. At step 1000, the VLM driver 210 receives a deallocation request from the consumer process 206. At step 1002, the VLM driver 210 issues a terminate notification to a donor process 208. The VLM driver 210 repeats step 1002 until at step 1004, the VLM driver 210 detects that a deallocate command has been issued to all the donor processes 208.

Returning to FIG. 8, at step 806, the donor process 208 detects a terminate notification from the VLM driver 210. At step 808 the donor process 208 deallocates the memory by sending requests to the operating system 200. At step 810, the donor process 208 sends a response to the VLM driver 210 indicating that memory has been deallocated.

The terminate notification from the VLM driver 210 to the donor process 208 is sent on the abnormal shutdown of the driver. This notification to the donor process 208 is sent by the cancellation of a pending I/O request. On receiving this notification, the donor process 208 deallocates memory and terminates.

In the event of normal termination, the terminate notification is sent on the completion of the donor process 208 ending the I/O request.

Continuing with FIG. 10, at step 1006 upon receiving a response from a donor process 208 indicating that memory has been deallocated, at step 1008, the VLM driver 210 terminates the donor process 208. At step 1010, the VLM driver 210 waits until all the donor processes 208 have been terminated. At step 1012, after all the donor processes 208 have been terminated the VLM driver 210 sends a response to the consumer process 206 that all memory has been deallocated. The consumer process 206 then terminates.

It will be apparent to those of ordinary skill in the art that methods involved in the present system for extending an addressable range of memory may be embodied in a computer program product that includes a computer usable medium. For example, such a computer usable medium can include a readable memory device, such as a hard drive device, a CD-ROM, a DVD-ROM or a computer diskette, having computer readable program code segments stored thereon. The computer readable medium can also include a communications or transmission medium, such as a bus or a communications link, either wired, optical or wireless having program code segments carried thereon as digital or analog data signals.

While this invention has been particularly shown and described with references to embodiments thereof, it will be understood by those skilled in the art that various changes in form and details may be made therein without departing from the spirit and scope of the invention as defined by the appended claims.

What is claimed is:

1. A computer implemented method for allocating memory by an operating system having a maximum process memory size for a consumer process, the method comprising:
   receiving, in a memory driver, a request for memory from a consumer process that requests an amount of memory greater than the maximum process memory size;
   creating at least one donor process from the memory driver;
   where the at least one created donor process:
      requests, from the operating system, an allocation of memory space having a size determined by the donor process;
      transfers ownership of the allocated memory space to the memory driver;
      holds the allocated memory space on behalf of the memory driver to prevent the operating system from re-allocating the memory space while the consumer process is accessing the allocated memory;
      de-allocates the memory space in response to a request from the memory driver to de-allocate the memory space; and
      from the memory driver, combining the allocated memory space transferred from the at least one donor process with memory space allocated to the consumer process, and availing the combined allocated memory space to the consumer process by processing memory read/write requests for the combined allocated memory space from the consumer process.

2. The computer implemented method of claim 1, comprising mapping physical memory associated with the combined allocated memory space to a virtual address space of the consumer process with the memory driver.

3. The computer implemented method of claim 1, comprising mapping physical memory associated with the combined allocated memory space to a buffer of virtual memory accessible to the consumer process with the memory driver in response to a read/write request from the consumer process.

4. The computer implemented method of claim 1, after transferring ownership of allocated memory to the memory driver, the at least one donor process sleeps until a terminate request is received from the memory driver.

5. The computer implemented method of claims 4, where the at least one donor process holds the allocated memory by entering a sleep state and wakes up in response to a terminate request from the memory driver to de-allocate the allocated memory.

6. A non-transitory computer-readable medium that stores a computer program product for allocating memory by an operating system having a maximum process memory size for a consumer process, which when executed by a computer causes the computer to perform a method, the method comprising:
  receiving, in a memory driver, a request for memory from a consumer process that requests an amount of memory greater than the maximum process memory size;
  creating at least one donor process from the memory driver;
  where the at least one donor process:
    requests, from the operating system, an allocation of memory space having a size determined by the donor process;
    transfers ownership of the allocated memory space to the memory driver;
    holds the allocated memory space on behalf of the memory driver to prevent the operating system from re-allocating the memory space while the consumer process is accessing the allocated memory;
    de-allocates the memory space in response to a request from the memory driver to de-allocate the memory space; and
    from the memory driver, combining the allocated memory space transferred from the at least one donor process with memory space allocated to the consumer process, and availing the combined allocated memory space to the consumer process by processing memory read/write requests for the combined allocated memory space from the consumer process.

7. The non-transitory computer-readable medium of claim 6, where the method comprises mapping, with the memory driver, physical memory associated with the combined allocated memory space to a virtual address space of the consumer process.

8. The non-transitory computer-readable medium of claim 6, where the method comprises in response to a read/write request from the consumer process, mapping, with the memory driver, physical memory associated with the combined allocated memory space to a buffer of virtual memory accessible to the consumer process.

9. The non-transitory computer-readable medium of claim 6, where donor process holds the allocated memory by entering a sleep state and wakes up in response to a terminate request from the memory driver to de-allocate the allocated memory.

10. The non-transitory computer-readable medium of claim 6, where the at least one donor process wakes up in response to a release signal from the memory driver.

11. A computer system comprising:
  a central processing unit;
  a memory system connected to the central processing unit;
  an operating system and consumer process resident in the memory system, the operating system further comprising a memory driver configured to:
    receive a request, from the consumer process, for allocation of memory greater than a maximum process memory size allowed by the operating system for a consumer;
    create at least one donor process, where at least one donor process allocates a memory space having a size determined by the donor process;
    transfer ownership of the allocated memory space to the memory driver;
    hold the allocated memory space on behalf of the memory driver to prevent the operating system from re-allocating the memory space while the consumer process is accessing the allocated memory; and
    de-allocate the memory space in response to a request from the memory driver to de-allocate the memory space;
      where the memory driver combines the allocated memory space transferred from the at least one donor process with memory space allocated to the consumer process and avails the combined allocated memory space to the consumer process by processing memory read/write requests for the allocated memory space from the consumer process.

12. The computer system of claim 11, where the at least one donor process wakes up in response to a release signal from the memory driver.

13. The computer system of claim 12, where the memory driver is configured to map physical memory associated with the combined allocated memory space to a virtual address space of the consumer process.

14. The computer system of claim 13, where, in response to a read/write request from the consumer process, the memory driver maps physical memory associated with the combined allocated memory space to a buffer of virtual memory accessible to the consumer process.

15. The computer system of claim 14, where the donor process holds the allocated memory by entering a sleep state and wakes up in response to a terminate request from the memory driver to de-allocate the allocated memory.

* * * * *

UNITED STATES PATENT AND TRADEMARK OFFICE
CERTIFICATE OF CORRECTION

PATENT NO.      : 8,108,873 B1
APPLICATION NO. : 11/724522
DATED           : January 31, 2012
INVENTOR(S)     : Frank et al.

It is certified that error appears in the above-identified patent and that said Letters Patent is hereby corrected as shown below:

IN THE SPECIFICATIONS:

In column 1, line 18, delete "bits," and insert -- bits --, therefor.

In column 2, line 57, delete "memory." and insert -- memory; --, therefor.

In column 2, line 60, delete "process;" and insert -- process. --.

In column 6, line 37, delete "206" and insert -- 206. --, therefor.

IN THE CLAIMS:

In column 9, line 5, in Claim 5, delete "claims" and insert -- claim --, therefor.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,108,873 B1  
APPLICATION NO. : 11/724522  
DATED : January 31, 2012  
INVENTOR(S) : Frank et al.

Page 1 of 1

It is certified that error appears in the above-identified patent and that said Letters Patent is hereby corrected as shown below:

Title page, after "(22) Filed: March 14, 2007", insert:

--Related U.S. Application Data

(62) Division of application no. 09/321,809, filed on May 28, 1999.--

Signed and Sealed this
Twenty-eighth Day of August, 2012

David J. Kappos
*Director of the United States Patent and Trademark Office*